United States Patent
Tseng

(10) Patent No.: US 8,873,583 B2
(45) Date of Patent: *Oct. 28, 2014

(54) METHOD AND APPARATUS FOR IMPROVING RESET OF EVOLVED MEDIA ACCESS CONTROL PROTOCOL ENTITY IN A WIRELESS COMMUNICATIONS SYSTEM

(75) Inventor: Li-Chih Tseng, Taipei (TW)

(73) Assignee: Innovative Sonic Limited, Ebene (MU)

(*) Notice: Subject to any disclaimer, the term of this patent is extended or adjusted under 35 U.S.C. 154(b) by 257 days.

This patent is subject to a terminal disclaimer.

(21) Appl. No.: 12/236,474

(22) Filed: Sep. 23, 2008

(65) Prior Publication Data
US 2009/0086756 A1 Apr. 2, 2009

Related U.S. Application Data

(60) Provisional application No. 60/975,518, filed on Sep. 27, 2007.

(51) Int. Cl.
*H04J 3/16* (2006.01)
*H04L 1/18* (2006.01)
*H04J 3/00* (2006.01)

(52) U.S. Cl.
CPC *H04L 1/1829* (2013.01); *H04J 3/00* (2013.01)
USPC .......................... 370/469; 370/200; 455/434

(58) Field of Classification Search
CPC ................ H04J 3/00; H04J 3/16; H04J 3/22
USPC ................ 370/200–253, 328, 503, 469, 310; 455/434–436
See application file for complete search history.

(56) References Cited

U.S. PATENT DOCUMENTS

| 2008/0188220 A1* | 8/2008 | DiGirolamo et al. ......... 455/434 |
| 2008/0188224 A1* | 8/2008 | Pani et al. .................... 455/436 |
| 2008/0225765 A1* | 9/2008 | Marinier et al. ............. 370/310 |
| 2009/0092077 A1* | 4/2009 | Pirskanen et al. ........... 370/328 |

FOREIGN PATENT DOCUMENTS

| KR | 1020040015672 | | 2/2004 |
| KR | 1020070033290 | A | 3/2007 |
| KR | 1020070037980 | A | 4/2007 |

OTHER PUBLICATIONS

Nokia et al:"MAC-ehs queue reset", 3GPP TSG-RAN-WG2 Meeting #58bis, R2-072686, Jun. 25-29, 2007, pp. 1-3, XP050135477.

(Continued)

*Primary Examiner* — Ricky Ngo
*Assistant Examiner* — Iqbal Zaidi
(74) *Attorney, Agent, or Firm* — Blue Capital Law Firm, P.C.

(57) ABSTRACT

In order to enhance system efficiency, a method of improving reset of an evolved media access control (MAC-ehs) protocol entity for a user equipment in a wireless communications system is disclosed. The MAC-ehs entity includes a first reset function and a second reset function. The first reset function is activated according to an upper layer request, while the second rest function is activated when any reset timer of the MAC-ehs protocol entity expires. The method includes the steps of activating the first reset function, and stopping all active reset timers of the MAC-ehs protocol entity and setting all reset timers of the MAC-ehs protocol entity to their initial values.

6 Claims, 4 Drawing Sheets

(56) References Cited

OTHER PUBLICATIONS

"Universal Mobile Telecommunications Systems (UMTS); Medium Access Control (MAC) protocol specification (3GPP TS 25.321 version 7.5.0. Release 7); ETSI TS 125 321", vol. 3-R2, No. v7.5.0, pp. 1-145, XP014037916, Jun. 1, 2007.

Rapporteur (Interdigital): "Summary of email discussion on reordering issue in Enhanced Cell_Fach", 3GPP TSG-RAN WG2#58bis, Tdoc R2-072907, Jun. 25-29, 2007, pp. 1-19, XP050135673.

3GPP, R2-073693 3GPP TSG-RAN WG2 Meeting #59, "Periodic MAC-ehs reset and setting of the expected TSN", Aug. 2007.

3GPP, R1-073146 3GPP TSG-RAN WG2 Meeting #59, "Periodic MAC-ehs reset", Jun. 2007.

3GPP, R2-073229 3GPP TSG-RAN WG2 Meeting #59, "RLC Window Operation", Aug. 2007.

NTT DoCoMo Inc., "Open issue list for Stage 3 E-UTRA RLC version 3", Oct. 2007.

3GPP TS 25. 321 V5.13.0 (Mar. 2007), "Medium Access Control (MAC) protocol specification," p. 51-54, Mar. 31, 2007.

3GPP TSG-RAN WG2 Meeting #61, R2-081104, "Correction to the operation of the timer Treset," Feb. 11-15, 2008, Sorrento, Italy.

3GPP TSG-RAN WG2 Meeting #61, R2-081103, "Correction to the operation of the timer Treset," Feb. 11-15, 2008, Sorrento, Italy.

3GPP TS 25.321 V7.9.0 (May 2008), 3rd Generation Partnership Project, Technical Specification Group Radio Access Network; "Medium Access Control (MAC) Protocol specification (Release 7)," p. 1-6/97-99.

* cited by examiner

METHOD AND APPARATUS FOR IMPROVING RESET OF EVOLVED MEDIA ACCESS CONTROL PROTOCOL ENTITY IN A WIRELESS COMMUNICATIONS SYSTEM

CROSS REFERENCE TO RELATED APPLICATIONS

This application claims the benefit of U.S. Provisional Application No. 60/975,518, filed on Sep. 27, 2007 and entitled "Method and Apparatus for improving reordering method under the condition of inactive transmission and enhancing the efficiency of HARQ and ARQ", the contents of which are incorporated herein by reference.

BACKGROUND OF THE INVENTION

1. Field of the Invention

The present invention relates to a method and apparatus for resetting a MAC-ehs protocol entity of a wireless communications system, and more particularly to a method and apparatus for improving reset of a MAC-ehs protocol entity for a user equipment in a wireless communications system, so as to enhance system efficiency.

2. Description of the Prior Art

The third generation (3G) mobile telecommunications system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS (Quality of Service) requirements simultaneously, providing diverse, flexible, two-way transmission services and better communication quality to reduce transmission interruption rates. Through the 3G mobile telecommunications system, a user can utilize a wireless communications device, such as a mobile phone, to realize real-time video communications, conference calls, real-time games, online music broadcasts, and email sending/receiving. However, these functions rely on fast, instantaneous transmission. Thus, targeting the third generation mobile telecommunication technology, the prior art provides High Speed Package Access (HSPA) technology, which includes High Speed Downlink Package Access (HSDPA) and High Speed Uplink Package Access (HSUPA), to increase bandwidth utility rate and package data processing efficiency to improve uplink/downlink transmission rate.

HSDPA and HSUPA adopt Hybrid Automatic Repeat Request (HARQ) technology to enhance retransmission rate and reduce transmission delay. HARQ is a technology combining Feed-forward Error Correction (FEC) and ARQ methods, which makes a Universal Terrestrial Radio Access Network (UTRAN) trigger retransmission according to positive/negative acknowledgement signals (ACK/NACK) transmitted from a user equipment (UE), and the UE stores useful information about the last failed transmission for later use.

To further increase transmission efficiency, 3GPP newly introduces an evolved high speed Media Access Control (MAC-ehs) protocol entity in the MAC layer to support segmentation, reordering, and reassembly of Radio Link Control (RLC) Protocol Data Units (PDUs) with variable lengths. In addition, the MAC-ehs protocol entity can further multiplex data of various priority queues to a MAC-ehs PDU in a Transmission Time Interval (TTI) for enhancing the flexibility of data scheduling.

Besides, in order to advance a reordering functionality of the MAC-ehs protocol entity, the 3GPP further introduces a reset timer for each priority queue, which is mainly used for resetting a receiver window of the reordering functionality when no PDU is successfully received by the UE for a specific duration, i.e. an expiry time of the reset timer, for avoiding following received PDUs being discarded incorrectly. Detailed operations of the MAC-ehs entity and the reset timer can be found in the MAC protocol specification formulated by the 3GPP, and are not narrated herein.

Accordingly, the prior art provides a first reset function and a second reset function in the MAC-ehs protocol entity to respectively satisfy reset requirements of the upper layers and the reset timer. The first reset function is performed by request of upper layers, such as a Radio Resource Control (RRC) layer, for resetting the MAC-ehs protocol entity when configurations of the UE are changed, e.g. during handover; the second reset function is activated when any reset timer in the MAC-ehs protocol entity expires for resetting the reordering functionality of the MAC-ehs protocol entity. When either of the first reset function and the second reset function is performed, all configured HARQ processes are flushed.

However, according to the above MAC protocol specification, when the first reset function is performed by the request of the upper layer, the reset timer is not stopped. Thus, it is very likely that the second reset function will be activated in a short period of time due to expiration of the reset timer, and steps like flushing all configured HARQ processes will be repeated. In such a situation, data stored in the HARQ buffer that has not been successfully decoded during the time the first reset function and the second reset function are successively activated is all discarded, so as to decrease the probability of successful decoding by the UE.

In short, since the second reset function may be activated incorrectly in the prior art, the probability of successful decoding by the UE is decreased.

SUMMARY OF THE INVENTION

It is therefore an objective of the present invention to provide a method and apparatus of improving reset of an evolved high speed media access control, named MAC-ehs hereinafter, protocol entity for a user equipment in a wireless communications system, so as to enhance system efficiency.

According to the present invention, a method of improving reset of a MAC-ehs protocol entity for a user equipment in a wireless communications system is disclosed. The MAC-ehs protocol entity includes a first reset function and a second reset function. The first reset function is activated according to an upper layer request while the second rest function is activated when any reset timer in the MAC-ehs protocol entity expires. The method includes steps of activating the first reset function; and stopping all active reset timers in the MAC-ehs protocol entity and setting all reset timers in the MAC-ehs protocol entity to their initial states.

According to the present invention, a communications device used in a wireless communications system for improving reset of a MAC-ehs protocol entity is further disclosed. The MAC-ehs protocol entity includes a first reset function and a second reset function. The first reset function is activated according to an upper layer request while the second rest function is activated when any reset timer of the MAC-ehs protocol entity expires. The communications device includes a control circuit for realizing functions of the communications device; a processor installed in the control circuit, for executing a program code to command the control circuit; and a memory installed in the control circuit and coupled to the processor for storing the program code. The program code includes steps of activating the first reset function; and stopping all active reset timers in the MAC-ehs protocol entity and setting all reset timers in the MAC-ehs protocol entity to their initial values.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
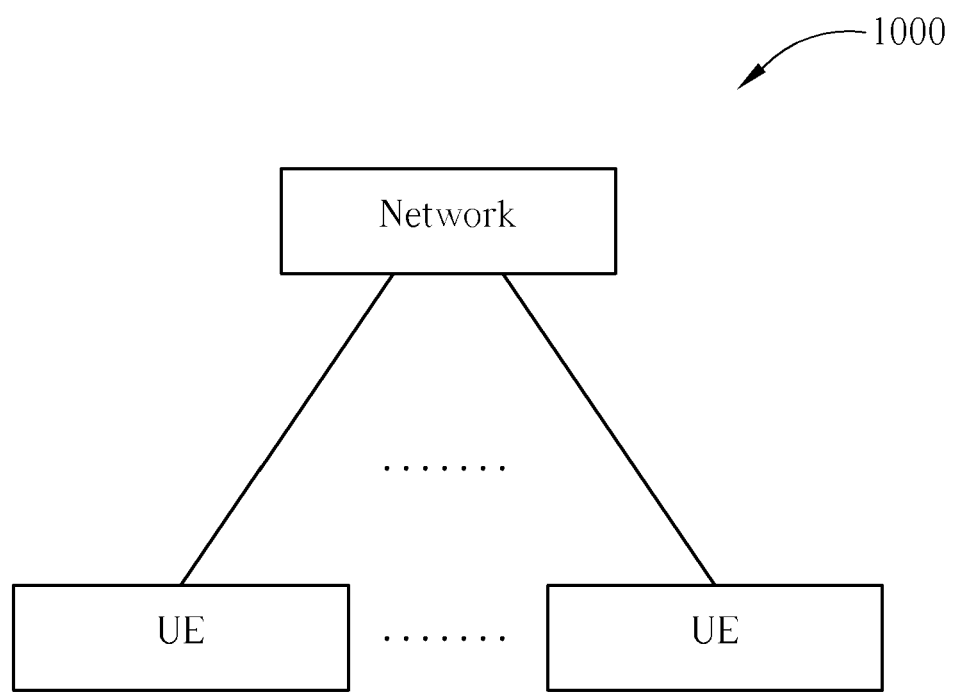
FIG. 4 is a diagram of a wireless communications system.

Please refer to FIG. 4, which is a schematic diagram of a wireless communications system 1000. The wireless communications system 1000 can be an Evolved High Speed Packed Access (Evolved HSPA) system or other communications system, and is briefly composed of a network and a plurality of user equipments (UEs). In FIG. 4, the network and the UEs are simply utilized for illustrating the structure of the wireless communications system 1000. Practically, the network may comprise a plurality of base stations (or Node B), radio network controllers and so on according to actual demands, and the UEs can be devices such as mobile phones, computer systems, etc.

Figure 1:
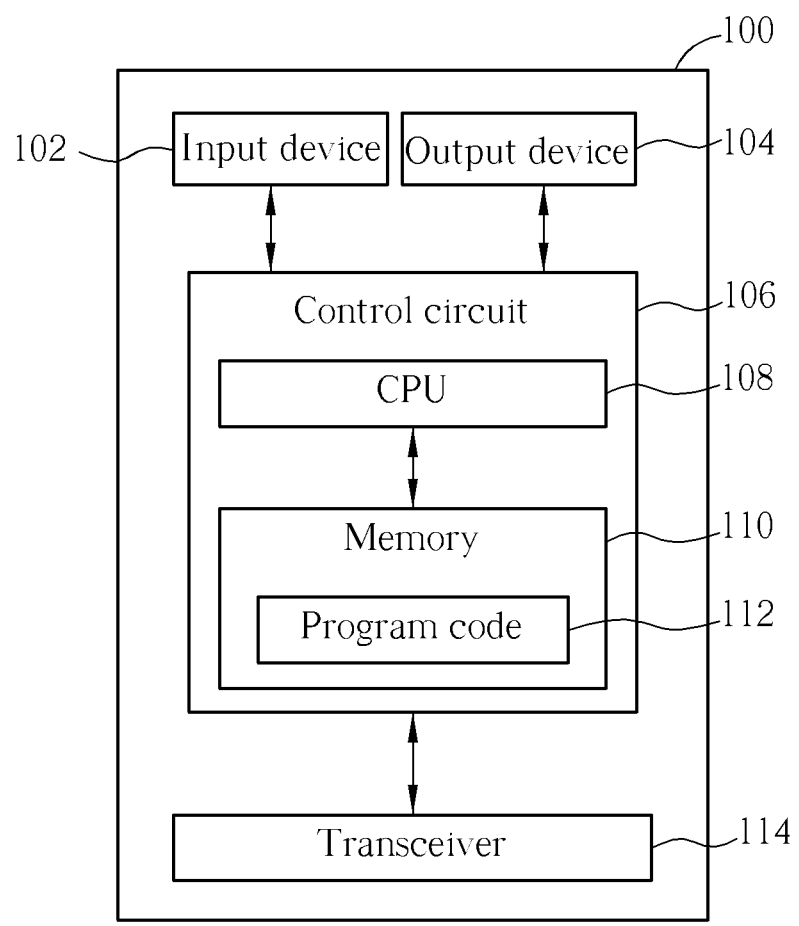
FIG. 1 is a functional block diagram of a communications device.

Please refer to FIG. 1, which is a functional block diagram of a communications device 100. The communications device 100 can be used for implementing the network and the UE shown in FIG. 4. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, deliver received signals to the control circuit 106, and output signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 2:
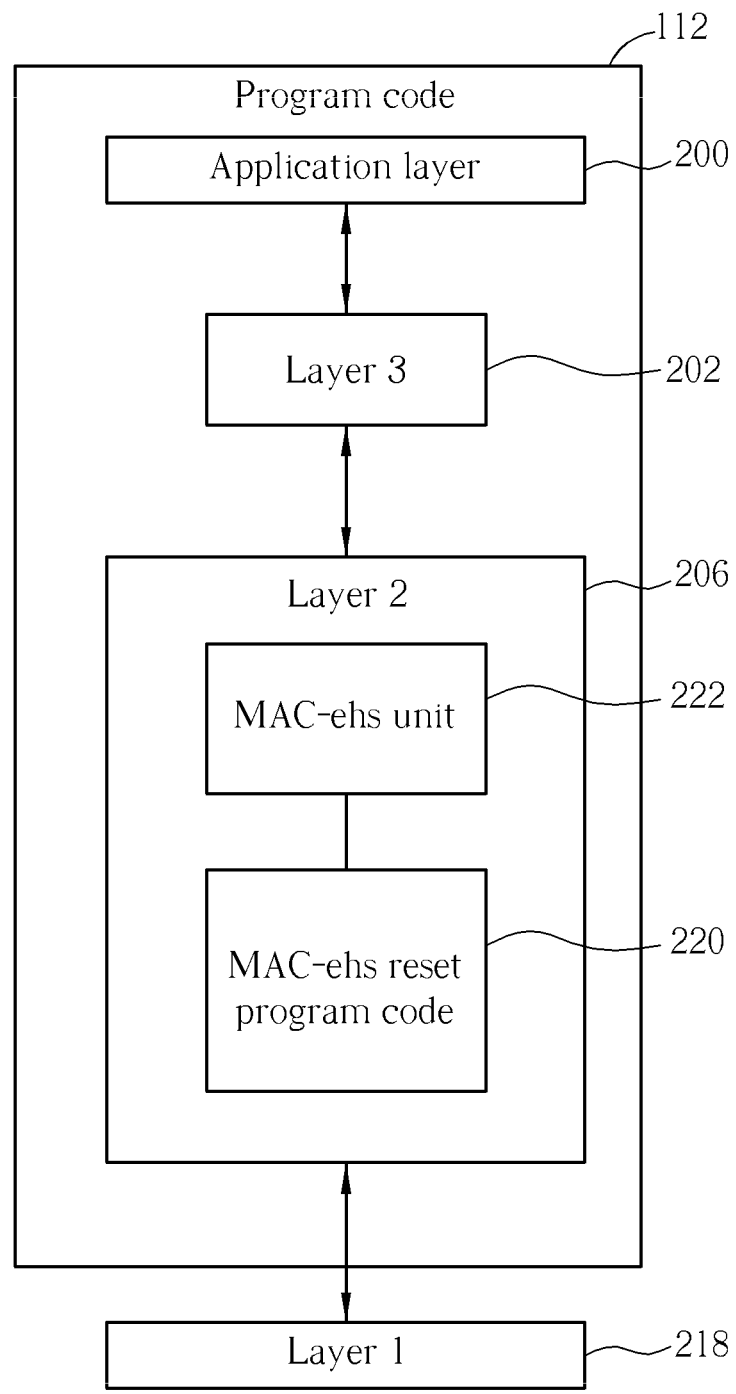
FIG. 2 is a diagram of the program code shown in FIG. 1.

Please further refer to FIG. 2. FIG. 2 is a diagram of the program code 112 shown in FIG. 1. The program code 112 includes an application layer 200, a Layer 3 202, and a Layer 2 206, and is coupled to a Layer 1 218. The Layer 3 202 includes a Radio Resource Control (RRC) unit for controlling the Layer 1 218 and the Layer 2 206 according to RRC messages and Information Elements (IEs). The Layer 2 206 includes an evolved high speed Media Control Access (MAC-ehs) unit 222 for handling MAC-ehs Protocol Data Units (PDUs).

In general, the MAC-ehs protocol entity includes a first reset function and a second reset function to respectively satisfy reset requirements of the upper layers and a reset timer. The first reset function is performed by the request of the upper layers, such as the RRC layer, for resetting the MAC-ehs protocol entity when configurations of the UE are changed, e.g. during handover; and the second reset function is activated when any reset timer of the MAC-ehs protocol entity expires for resetting a reordering functionality of the MAC-ehs protocol entity. In this case, the embodiment of the present provides a MAC-ehs reset program code 220 in the program code 112 to correctly execute the reset of the MAC-ehs protocol entity, so as to avoid the second reset function being activated incorrectly.

Figure 3:
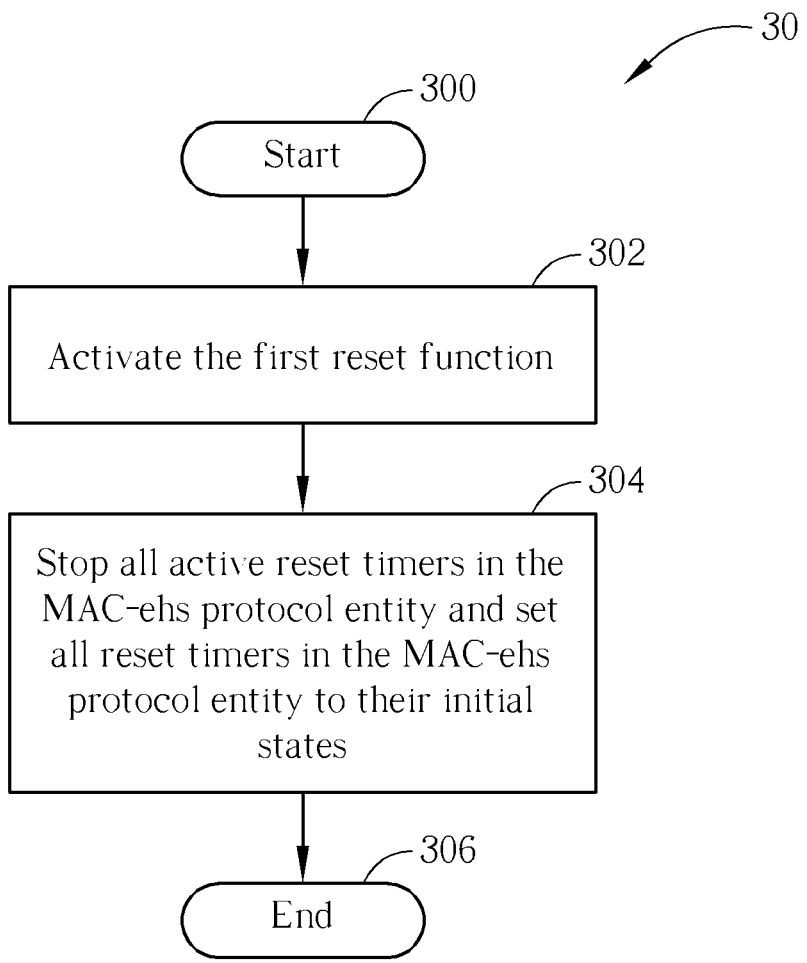
FIG. 3 is a flow chart of a process according to an embodiment of the present invention.

Please refer to FIG. 3, which illustrates a schematic diagram of a process 30 according to an embodiment of the present invention. The process 30 is utilized for improving reset of a MAC-ehs protocol entity for a user equipment in a wireless communications system, and can be compiled into the MAC-ehs reset program code 220. The process 30 includes the following steps:

Step 300: Start.
Step 302: Activate the first reset function.
Step 304: Stop all active reset timers in the MAC-ehs protocol entity and set all reset timers in the MAC-ehs protocol entity to their initial states.
Step 306: End.

According to the process 30, the first reset function is firstly activated by request of the upper layers. Then, all active reset timers of the MAC-ehs protocol entity are stopped and all reset timers of the MAC-ehs protocol entity are set to their initial values in the embodiment of the present invention. Note that each reset timer is utilized for controlling reset of a reordering functionality in the MAC-ehs protocol entity.

In other words, when the MAC-ehs protocol entity activates the first reset function according to the request of the upper layer, the embodiment of the present invention stops all active reset timers of the MAC-ehs protocol entity and sets all reset timers of the MAC-ehs protocol entity to their initial values, so that incorrect activation of the second reset function can be avoided. Thus, in the embodiment of the present invention, the reset of the MAC-ehs protocol entity can be improved to enhance system efficiency.

In addition, when any reset timer of the MAC-ehs protocol entity is expired, steps like activating the second reset function can also be included in the embodiment of the present invention. Such operation is well-know by those skilled in the art, and thus not narrated herein.

As mentioned above, when the reset of MAC-ehs protocol entity is performed by the request of the upper layer, the steps of stopping all active reset timers and setting all reset timers to their initial states are added in the embodiment of the present invention, so as to enhance system efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A method of improving reset of an evolved media access control, named MAC-ehs hereinafter, protocol entity for a user equipment in a wireless communications system, the MAC-ehs protocol entity comprising a first reset function and a second reset function, the method comprising:
    starting a reset timer named Treset, wherein Treset controls the reset of the MAC-ehs reordering functionality, and wherein the second reset function is performed if Treset expires;

activating the first reset function by an upper layer request while Treset is running; and stopping Treset responsive to performing the first reset function by an upper layer request and setting Treset to an initial state of Treset before expiration of Treset to avoid activation of the second reset function when Treset expires.

2. The method of claim 1, wherein Treset is restarted when a reordering protocol data unit is received.

3. The method of claim 1, wherein the wireless communications system is an Evolved High Speed Packet Access system.

4. A communications device used in a wireless communications system for improving reset of an evolved media access control, named MAC-ehs hereinafter, protocol entity, the MAC-ehs protocol entity comprising a first reset function and a second reset function, the communications device comprising:

a control circuit for realizing functions of the communications device;

a central processing unit coupled to the control circuit for executing a program code to operate the control circuit; and a memory coupled to the central processing unit for storing the program code;

wherein the program code comprises:

starting a reset timer named Treset, wherein Treset controls the reset of the MAC-ehs reordering functionality, and wherein the second reset function is performed if Treset expires;

activating the first reset function by an upper layer request while Treset is running; and stopping Treset responsive to performing the first reset function by an upper layer request and setting Treset to an initial state of Treset before expiration of Treset to avoid activation of the second reset function when Treset expires.

5. The communications device of claim 4, wherein Treset is restarted when a reordering protocol data unit is received.

6. The communications device of claim 4, wherein the wireless communications system is an Evolved High Speed Packet Access system.

* * * * *